(12) United States Patent
Wright

(10) Patent No.: US 8,186,267 B2
(45) Date of Patent: *May 29, 2012

(54) TOOL FOR INSERTING "RUN FLAT" DEVICE INTO TIRE AND FOR REMOVING "RUN FLAT" DEVICE FROM TIRE

(75) Inventor: Wayne W. Wright, Oakland, MI (US)

(73) Assignee: Cornell Research Foundation, Inc, Ithaca, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/422,369

(22) Filed: Apr. 13, 2009

(65) Prior Publication Data
US 2010/0064909 A1    Mar. 18, 2010

Related U.S. Application Data

(63) Continuation of application No. 11/271,845, filed on Nov. 14, 2005, now Pat. No. 7,533,606.

(60) Provisional application No. 60/626,863, filed on Nov. 12, 2004.

(51) Int. Cl.
B30B 5/04    (2006.01)

(52) U.S. Cl. .............................. 100/212; 29/235; 29/802
(58) Field of Classification Search .................. 100/3, 8, 100/13, 32, 33 PB, 34, 212; 269/131, 132; 29/235, 802

See application file for complete search history.

(56) References Cited

U.S. PATENT DOCUMENTS

| 466,334 | A |   | 1/1892  | Ericksen |          |
|---------|---|---|---------|----------|----------|
| 863,289 | A |   | 8/1907  | Larson   |          |
| 1,005,994 | A | * | 10/1911 | Meierant | 100/34 |
| 1,115,085 | A | * | 10/1914 | Miller   | 100/212 |
| 4,714,016 | A |   | 12/1987 | Bond     |          |
| 4,900,203 | A |   | 2/1990  | Pope     |          |
| 5,242,153 | A |   | 9/1993  | Stuart   |          |
| 6,014,927 | A |   | 1/2000  | Hilford  |          |
| 6,189,443 | B1 |   | 2/2001  | Hilford  |          |
| 7,533,606 | B2 | * | 5/2009  | Wright   | 100/212 |

* cited by examiner

Primary Examiner — Jimmy T Nguyen
(74) Attorney, Agent, or Firm — Sughrue Mion, PLLC

(57) ABSTRACT

A tool for compressing a run flat device is provided. The tool contains a spool and a belt. The belt is wrapped around spool and the run flat device, and when the spool rotates, an effective length of the belt decreases to compress the run flat device.

14 Claims, 12 Drawing Sheets

TOOL FOR INSERTING "RUN FLAT" DEVICE INTO TIRE AND FOR REMOVING "RUN FLAT" DEVICE FROM TIRE

CROSS-REFERENCE TO RELATED APPLICATION

The present application is a continuation of U.S. application Ser. No. 11/271,845, filed Nov. 14, 2005, now U.S. Pat. No. 7,533,606, which claimed the benefit of priority from U.S. Provisional Application No. 60/626,863, filed on Nov. 12, 2004. The entire disclosure of the prior applications are considered part of the disclosure of the accompanying continuation application and are hereby incorporated by reference.

BACKGROUND OF EMBODIMENTS OF THE INVENTION

I. Field of the Invention

An illustrative, non-limiting embodiment of the present invention relates to a tool for inserting a "run flat" device into a tire and for removing a "run flat" device from a tire. In addition, an exemplary embodiment of the present invention relates to a method that the tool performs.

II. Description of the Related Art

Automobiles, trucks, and other vehicles have one or more wheels that rotatably support the vehicles as they move along the ground. For example, an automobile may contain wheels having tires with inner tubes filled with pressurized air or having tubeless tires filled with air. If one of these tires becomes punctured or damaged, it loses air pressure, becomes "flat," and is unable to support the weight of the automobile. In such a situation, a driver cannot drive the automobile without damaging the rim or other components of the vehicle and thus, must replace the flat tire with a new pressurized tire.

However, replacing the flat tire is time consuming and inconvenient. Furthermore, many drivers do not know how to replace a flat tire and must solicit help to change the tire. In such a situation, the amount of time and inconvenience required to replace the tire is increased. Moreover, if the driver is stranded in a remote area with no one available to help, the problem is compounded.

One way to overcome the above problem is to use a "run flat" device. A run flat device fits within the inner cavity of a wheel and helps maintain the shape of the wheel in the event that the wheel looses air pressure. As a result, when the wheel is punctured or damaged, it does not lose its shape, and a user can continue to drive or otherwise propel the vehicle without having to change the tire.

FIG. 1A shows a non-limiting example of a wheel 10, which has an inner cavity 12, and a run flat device 14. The run flat device 14 is relatively rigid and has an outer circumference that is approximately equal to or smaller than the inner circumference of the cavity 12 and, as shown in FIG. 1B, fits within the cavity 12. After fitting the device 14 within the cavity 12, the wheel 10 is fitted around a rim (not shown), and the rim is mounted on a vehicle. Since the run flat device 14 is rigid, if the wheel 10 loses air pressure, the wheel 10 does not collapse under the weight of the vehicle, maintains its shape, and continues to support the vehicle.

However, since the run flat device 14 is relatively rigid, compressing or contorting the device 14 to initially place it through the central opening 16 of the wheel 10 is difficult. Accordingly, a tool, which can quickly and easily squeeze or modify the shape of the device 14 to fit it through the opening 16 and into the cavity 12 is needed.

Also, a tool, which similarly can compress the device 14 to remove it from the wheel 10, is needed.

SUMMARY OF EMBODIMENTS OF THE INVENTION

An object of an illustrative, non-limiting embodiment of the present invention is to overcome the above and other problems and disadvantages associated with inserting a run flat device into a wheel and removing the device from the wheel. Also, the present invention is not required to overcome the disadvantages described above, and an illustrative, non-limiting embodiment of the present invention may overcome different disadvantages or may not overcome any disadvantages.

In accordance with one aspect of an illustrative non-limiting embodiment, a tool for compressing a run flat device is provided. The tool contains a spool and a belt. The belt is wrapped around spool and the run flat device, and when the spool rotates, an effective length of the belt decreases to compress the run flat device.

BRIEF DESCRIPTION OF THE DRAWINGS

The above and other objects and advantages of illustrative, non-limiting embodiments of the present invention will become more apparent by describing them in detail with reference to the attached drawings in which.

DETAILED DESCRIPTION OF ILLUSTRATIVE, NON-LIMITING EMBODIMENTS

The following description of the illustrative, non-limiting embodiments discloses specific configurations, components, and processes. However, the embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations, components, and processes of the embodiments that would have been known to one skilled in the art are omitted for the sake of clarity and brevity.

Figure 2A:
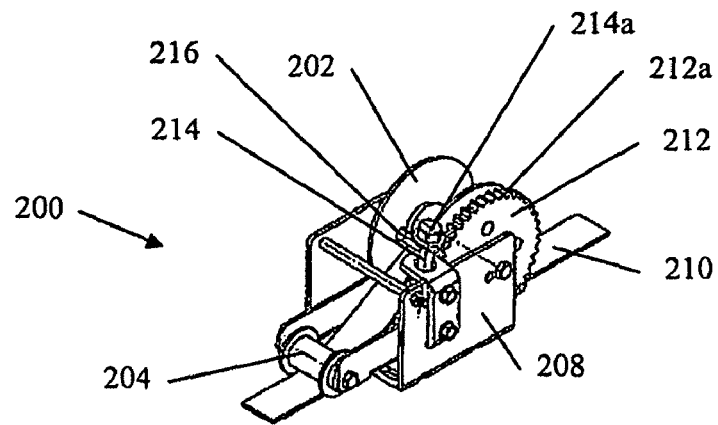
FIG. 2A is a perspective view of a tool in accordance with an illustrative, non-limiting embodiment of the present invention.
Figure 2B:
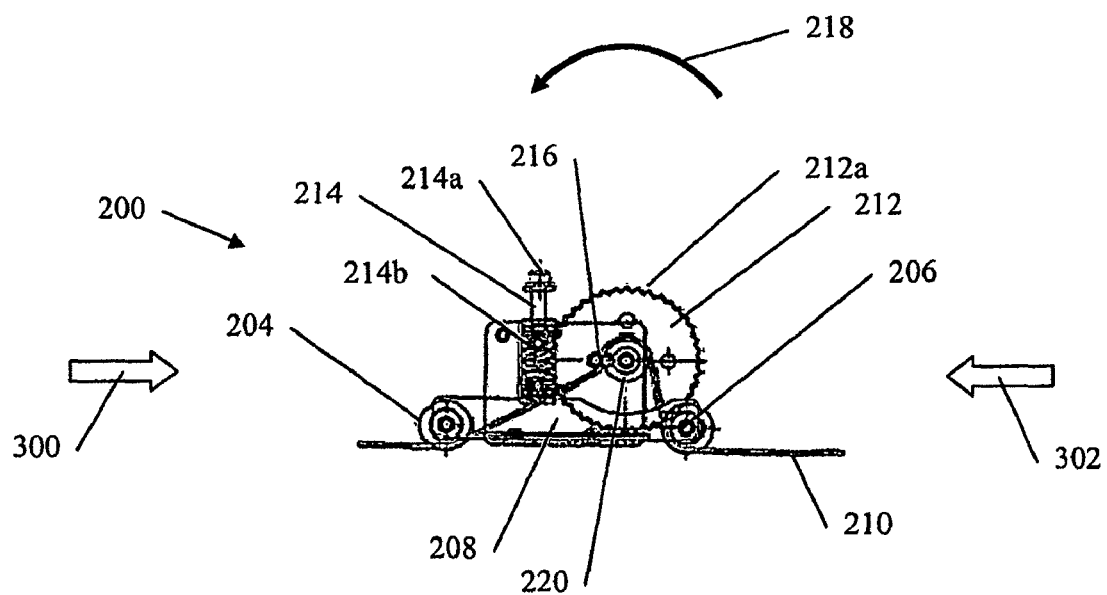
FIG. 2B is a cross-sectional side view of the tool shown in FIG. 2A.

FIG. 2A is a perspective view of an illustrative, non-limiting embodiment of a tool 200 for inserting a run flat device 14 into a wheel 10 and for removing the device 14 from the wheel 10. Also, FIG. 2B is a cross-sectional side view of the tool 200.

As shown in the figures, the tool 200 comprises a spool 202, a first roller 204, a second roller 206, and a housing 208 that rotatably supports the spool 202 and the rollers 204 and 206. Also, while the housing 208 includes various components bolted or welded together, the housing 208 may contain a single unit in which the various components are integrally formed or may contain multiple units in which a subset of the various components are integrally formed.

The housing 208 also rotatably supports a gear wheel 212 and a worm gear 214. The gear wheel 212 comprises teeth 212a along its outer circumference, is rigidly connected to the spool 202, and rotates in conjunction with the spool 202. The worm gear 214 comprises a polygon-shaped end 214a and has a threaded portion 214b that engages the teeth 212a of the wheel 212. Accordingly, when the worm gear 214 rotates around its longitudinal axis, the threaded portion 214b moves the teeth 212a and causes the gear wheel 212 to rotate, which in turn, causes the spool 202 to rotate.

A bar or bolt 216 extends across the spool 202 in parallel with and offset from the rotational axis of the spool 202. Moreover, the bolt 216 is rigidly connected to the walls of the spool 202 and revolves around the rotational axis of the spool 202 as the spool 202 rotates.

As best shown in FIG. 2B, the tool 200 comprises a belt 210 that is threaded underneath the roller 204 and the bolt 216, over a drum or core 220 of the spool 202, and underneath the roller 206. As a result of the above configuration, a user can rotate the worm gear 214 to rotate the spool 202 in the direction indicated by the arrow 218. When the spool 202 rotates in such manner, the bar or bolt 216 engages the upper portion of the belt 210 and forces the belt 210 around the core 220 of the spool 202 so that the belt 210 wraps upon itself around the core 220. By wrapping the belt 210 around the core 220, the effective length of the belt 210 becomes shorter.

Figure 3A:
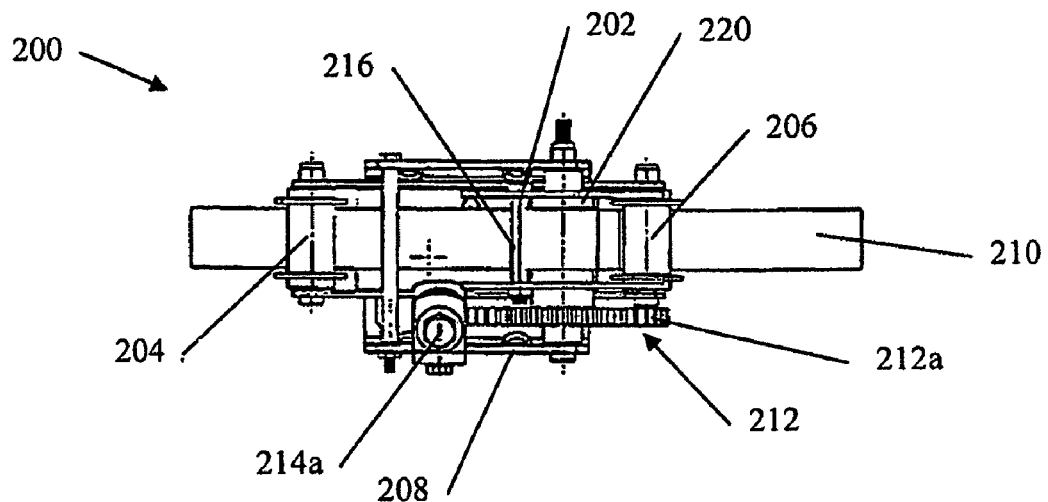
FIG. 3A is a top view of the tool shown in FIG. 2A.
Figure 3B:
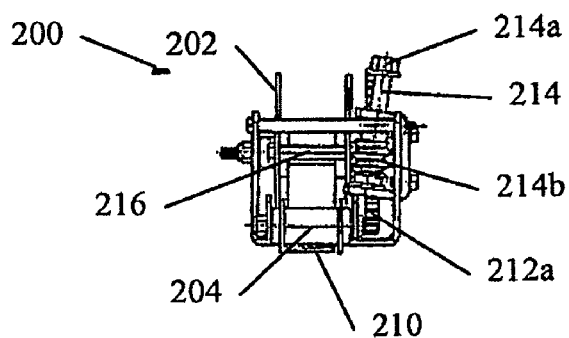
FIG. 3B is a first side view of the tool shown in FIG. 2A.
Figure 3C:
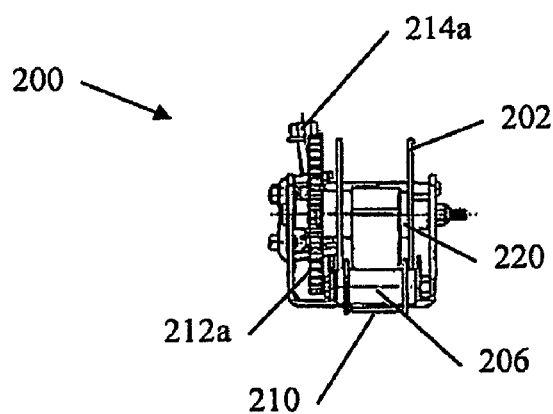
FIG. 3C is a second side view of the tool shown in FIG. 2A.

FIGS. 3A to 3C show other views of the tool 200. Specifically, FIG. 3A shows a top view of the tool 200. Also, FIG. 3B shows a side view of the tool 200 in the direction of the arrow 300 in FIG. 2B, and FIG. 3C shows a side view of the tool 200 in the direction of the arrow 302 in FIG. 2B.

Figure 4A:
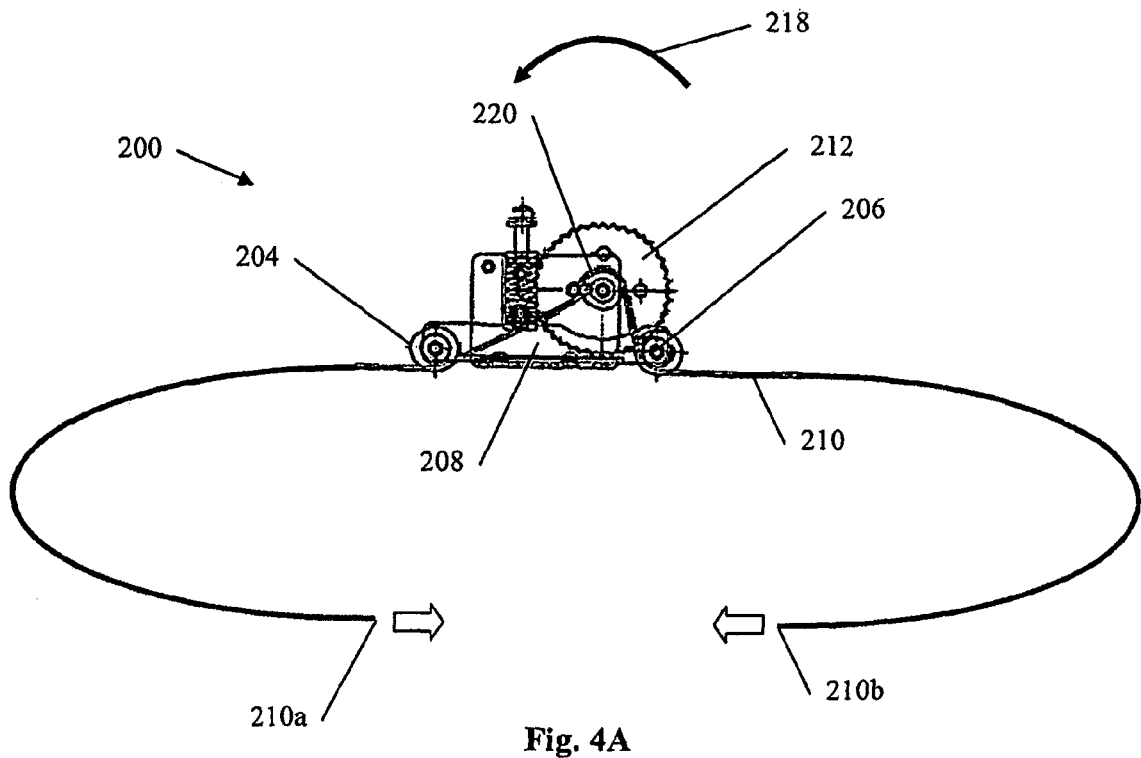
FIG. 4A shows an illustrative example of the tool shown in FIG. 2A before ends of a belt are joined together.
Figure 4B:
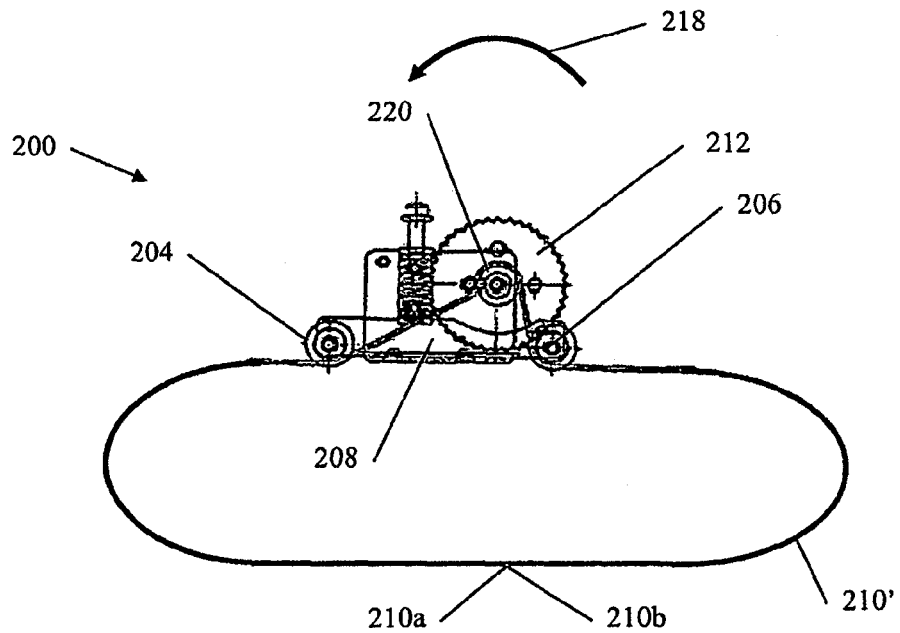
FIG. 4B shows an illustrative example of the tool shown in FIG. 2A after ends of the belt are joined together.

As shown in FIGS. 4A and 4B, one can connect the ends 210a and 210b of the belt 210 together to form a loop or an endless belt 210'. A user can use virtually any manner, method, or mechanism to join the ends 210a and 210b of the belt 210.

Figure 5A:
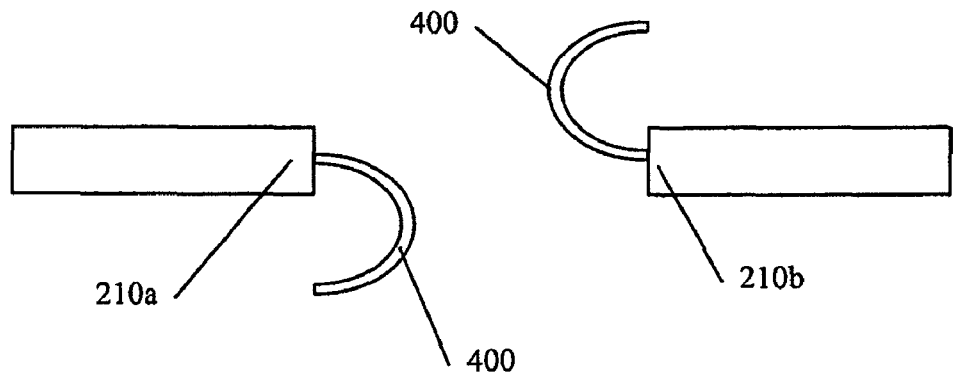
FIG. 5A shows an illustrative, non-limiting embodiment of a first fastener for joining the ends of a belt together.
Figure 5B:
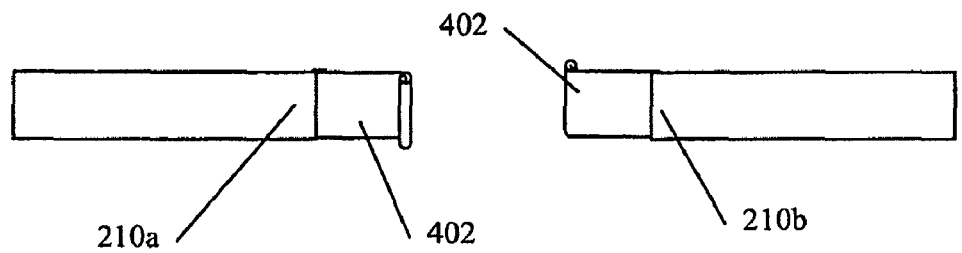
FIG. 5B shows an illustrative, non-limiting embodiment of a second fastener for joining the ends of a belt together.
Figure 5C:
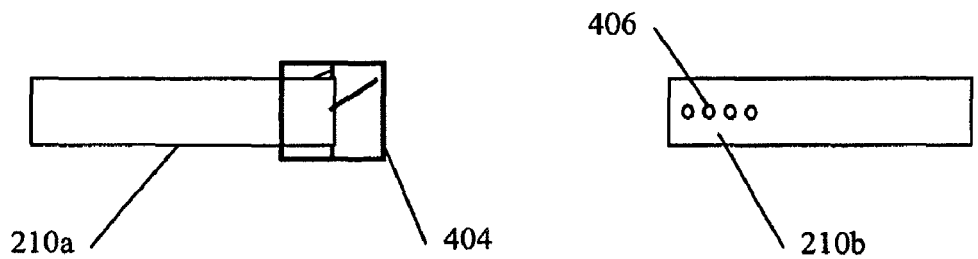
FIG. 5C shows an illustrative, non-limiting embodiment of a third fastener for joining the ends of a belt together.

For example, and not by way of limitation, the user can simply tie the ends 210a and 210b together. Alternatively, as shown in FIGS. 5A and 5B, the user can attach hooks 400 or clips 402 to the ends 210a and 210b to fasten them together. Also, as shown in FIG. 5C, the user can attach a buckle 404 to one end 210a of the belt 210 and form holes 406 in the other end 210b to join the ends 210a and 210b.

Figure 5D:
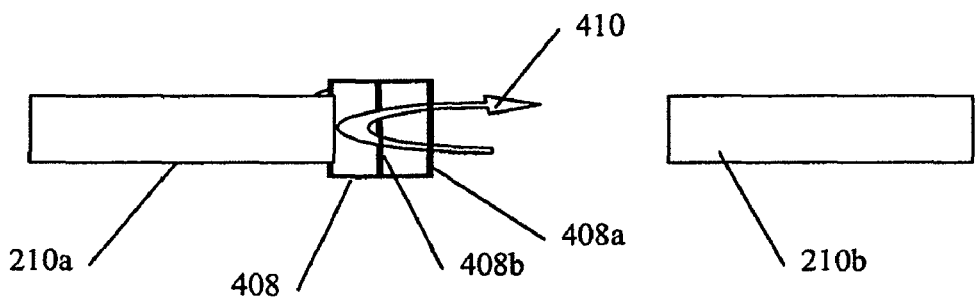
FIG. 5D shows an illustrative, non-limiting embodiment of a fourth fastener for joining the ends of a belt together.

Moreover, as shown in FIG. 5D, the user can use a loop-fastener 408 to connect the ends 210a and 210b together. Specifically, as indicated by the arrow 410, the user can feed the end 210b underneath the bars 408a and 408b of the fastener 408, around and over the bar 408b, and back underneath the bar 408a.

Figure 6:
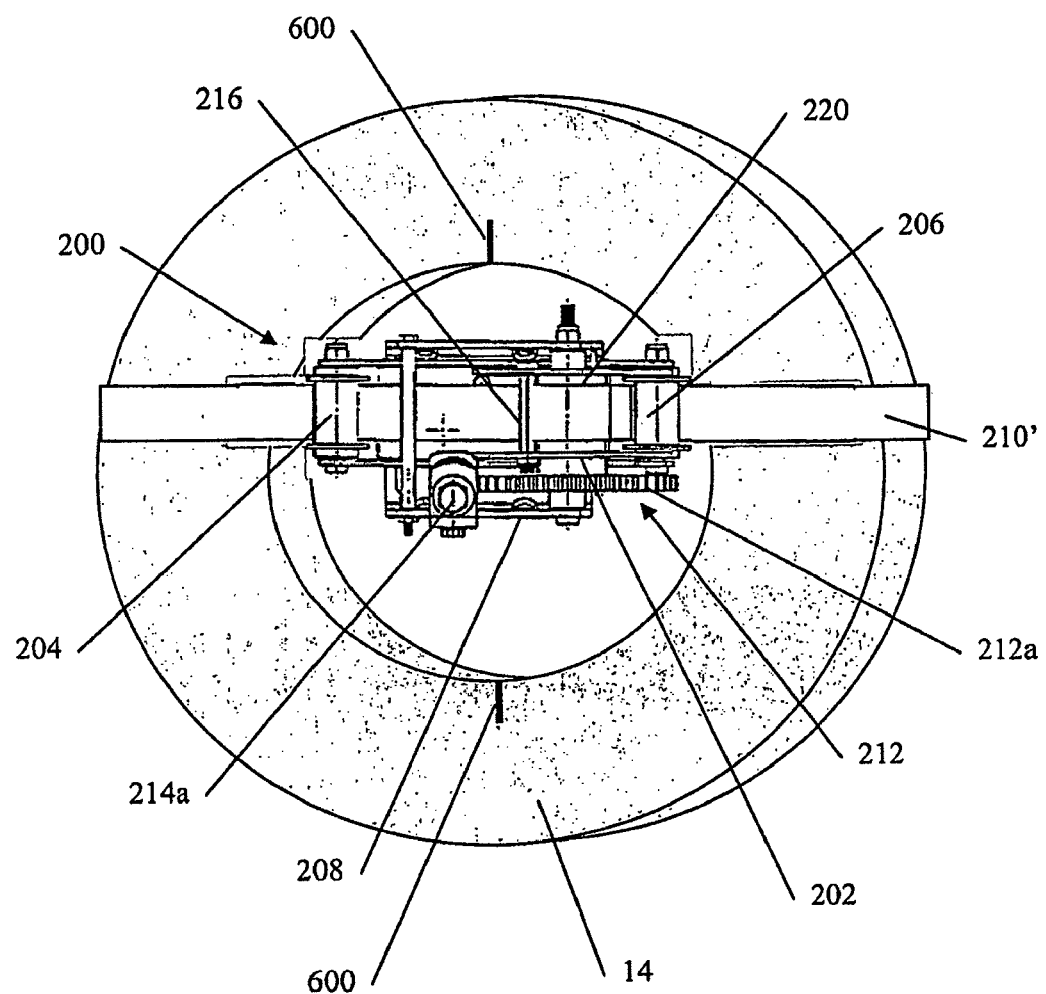
FIG. 6 shows an illustrative example of how the tool shown in FIG. 2A is attached to a run flat device before the tool compresses the run flat device.

The user can use the tool 200, as configured above, to easily compress the run flat device 14 to place it through the opening 16 and into the cavity 12 of the wheel 10. Specifically, as shown in FIG. 6, the user can connect the ends 210a and 210b of the belt 210 together to form the endless belt 210' and can place the endless belt 210' around the run flat device 14. Alternatively, the user can join the ends 210a and 210b after placing the belt 210 around the device 14. Moreover, as shown in the figure, the endless belt 210' is located a slight distance (e.g., two inches) above the midpoint of the run flat device 14. Also, some run flat devices 14 have notches 600, as shown in FIG. 6, to facilitate contorting the devices 14. In such cases, the user may place the belt 210' perpendicular to an imaginary line connecting the notches 600 as shown in the figure.

Of course, depending on the characteristics of the belt 210', the device 14, environmental factors, and other factors, a user may position the belt 210' at a different location and at a different orientation to obtain the optimal performance of the tool 200. Upon reading the specification, one skilled in the art would know how to optimally position and orient the belt 210' without undue experimentation.

In any event, after placing the belt 210' around the run flat device 14, the user turns the worm gear 214 to rotate the gear wheel 212 and spool 202 to decrease the effective length of the belt 210'. The user may use many different types of mechanisms to turn the worm gear 214. For example, and not by way of limitation, the user may fit an air ratchet, an air impact wrench, a socket attachment of a hand or power drill, or a hand crank around the polygon-shaped end 214a of the worm gear 214 to rotate the gear 214.

Figure 7:
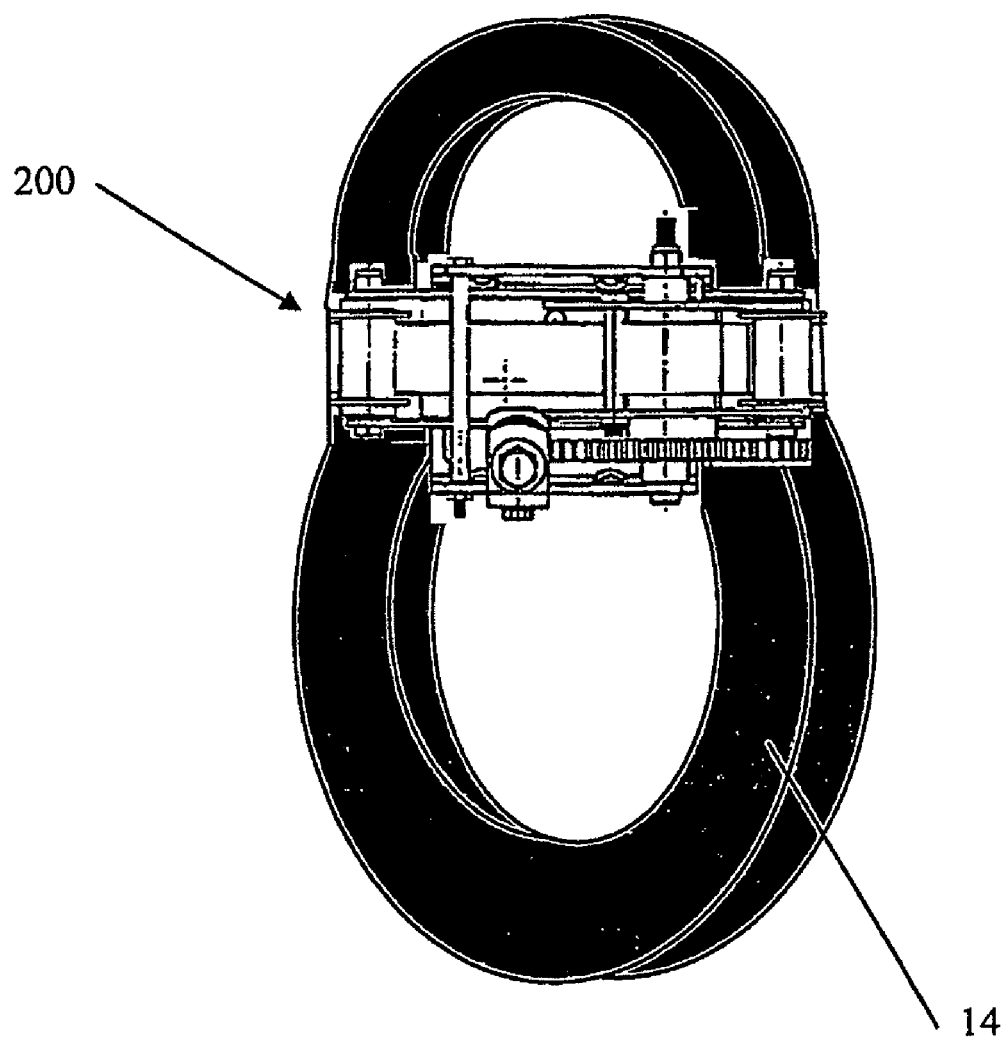
FIG. 7 shows an illustrative example of how the tool shown in FIG. 2A is attached to a run flat device after the tool compresses the run flat device.

As the belt 210' shortens to a predetermined length, the run flat device 14 compresses to the shape shown in FIG. 7. Furthermore, because the belt 210' winds upon itself around the core 220 of the spool 202, the tool 200 remains substantially centered on the run flat device 14 as it compresses the device 14.

Figure 1A:
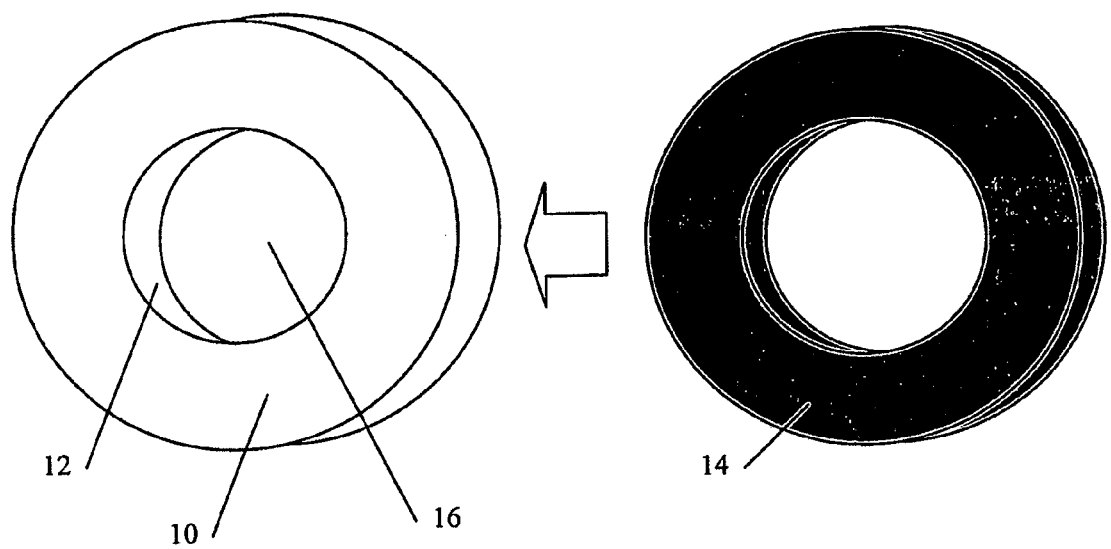
FIG. 1A shows an illustrative embodiment of a wheel and a run flat device.
Figure 1B:
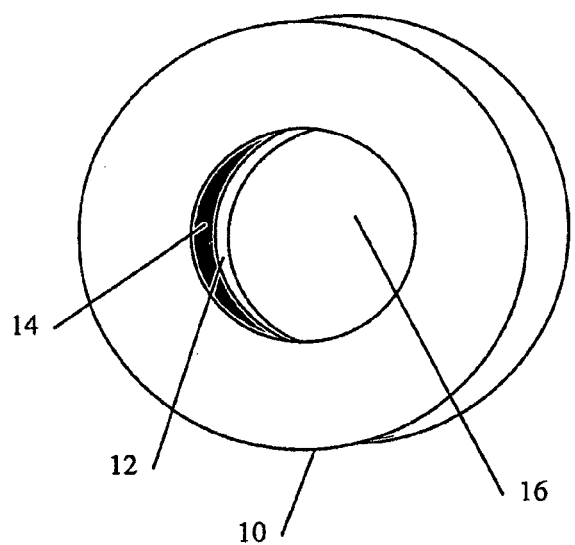
FIG. 1B shows an illustrative embodiment of the run flat device inserted into an inner cavity of the wheel shown in FIG. 1A.

In the compressed state, the user can insert the device 14 through the opening 16 of the wheel 10 and into the cavity 12. Then, the user can rotate the worm gear 214 in the opposite direction so that the run flat device 14 expands and fills the cavity 12 as shown in FIG. 1B. Afterwards, the user disconnects the ends 210a and 210b of the belt 210' and removes the tool 200 from the device 14. Furthermore, the user can remove the run flat device 14 from the tire simply by reversing the process described above.

Figure 8:
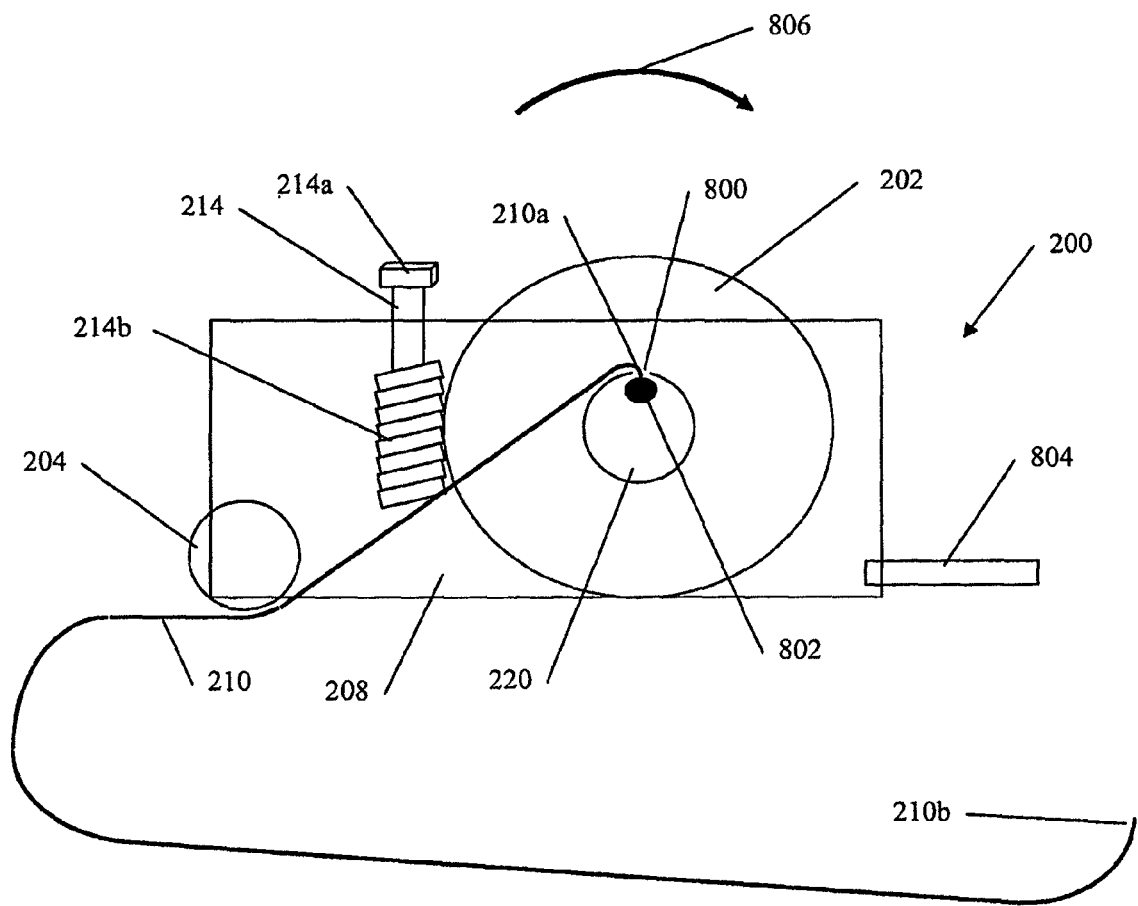
FIG. 8 is a perspective view of a tool in accordance with another illustrative, non-limiting embodiment of the present invention.

FIG. 8 is a cross-sectional view of another illustrative, non-limiting embodiment of the tool 200. Components that are the same as or similar to the components described above in conjunction with the previous embodiment are designated with the same reference numerals. Also, for the sake of clarity and brevity, a detailed discussion of such components will not be repeated.

As shown in FIG. 8, the tool 200 comprises a spool 202 that has a drum or core 220 which is at least partially hollow and which comprises a gap 800 that extends parallel to the rotational axis of the core 220. Furthermore, one end 210a of the belt 210 is inserted into the gap 800 and an anchor 802 is securely attached to the end 210a to anchor the belt 210 in the gap 800.

Also, the tool 200 comprises a fastener 804 that fastens the other end 210b of the belt 210 to the tool 200. The fastener 804 may comprise any mechanism to join the end 210b of the belt 210 to the tool 200. For example, and not by way of limitation, the fastener 804 may include a second belt, and the user may simply tie the end of the second belt 804 with the end 210b to join the belt 210 to the tool 200. Also, the fastener 804 may contain a hook 400 or clip 402, as shown in FIG. 5A or 5B, that connects to a corresponding hook 400 or clip 402 attached to the end 210b of the belt 210. Alternatively, the fastener 804 may comprise a buckle 404 or a loop-fastener 408, as shown in FIG. 5C or 5D, to couple the end 210b of the belt 210 to the tool 200 in the manner discussed above.

After the end 210b of the belt 210 is connected to the tool 200 via the fastener 804, a user can shorten the effective length of the belt 210 by rotating the worm gear 214 to rotate the spool 202 in the direction of the arrow 806. Non-limiting examples of devices that the user may use to rotate the gear 214 are described above in conjunction with the previous embodiment. Also, by shortening the length of the belt 210, the user can compress the run flat device 14 and insert it in the cavity 12 of the wheel 10 in the manner described above. Similarly, the user can remove the device 14 from the wheel 10 by reversing the process.

Figure 9A:
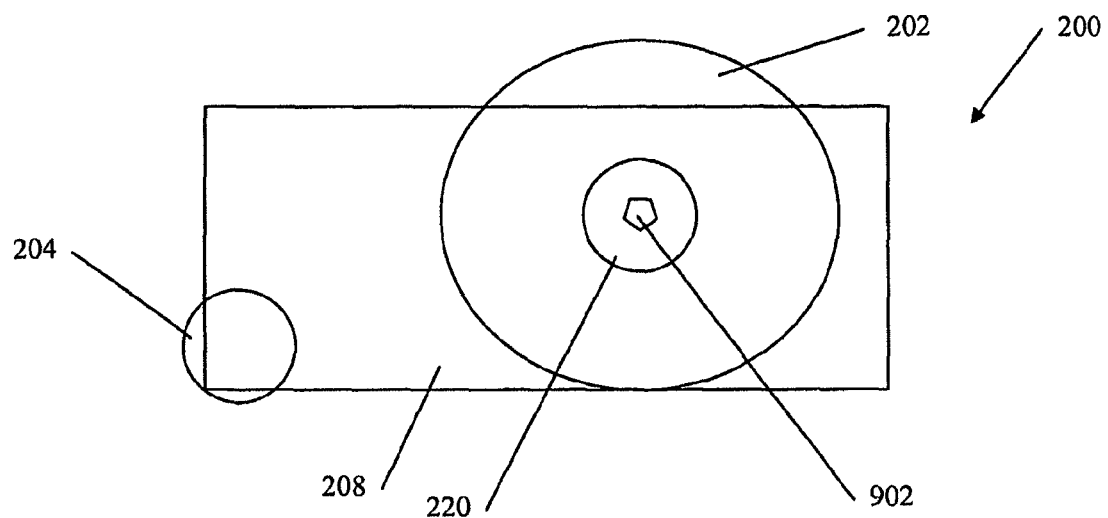
FIG. 9A is a side view of a tool in accordance with yet another illustrative, non-limiting embodiment of the present invention.
Figure 9B:
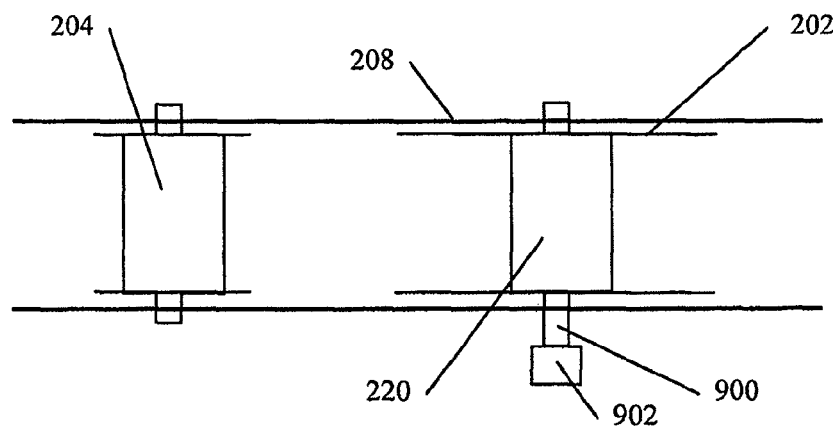
FIG. 9B is a top view of the tool shown in FIG. 9A.

In the above embodiments, the user rotates the worm gear 214 to indirectly rotate the spool 202 via the gear wheel 212. However, upon reading the present application, one skilled in the art will readily appreciate that other structures can be used to rotate the spool 202. For example, FIG. 9A shows a side view of an illustrative, non-limiting embodiment of a tool 200, and FIG. 9B shows a top view of the embodiment. (FIGS. 9A and 9B are simplified illustrations of the tool 200, and various components of the tool 200 that have been described in conjunction with the previous embodiments have been omitted for the sake of clarity).

As shown in the figures, the tool 200 comprises an axle 900, which rigidly supports a spool 202, and a housing 208, which rotatably supports the axle 900. Also, the axle 900 comprises a polygon-shaped end 902, and a user can rotate the spool 202 by coupling an appropriate rotating device to the end 902 of the axle 900. Non-limiting examples of possible rotating devices have been described above and include air ratchets, wrenches, drills, and hand cranks.

Accordingly, a user can compress a run flat device 14 by rotating the axle 900 in a first direction. Also, to prevent the spool 202 from rotating in a second direction (which is opposite to the first direction) and from causing the device 14 to decompress at an inappropriate time, a ratcheting system may be used.

Figure 10:
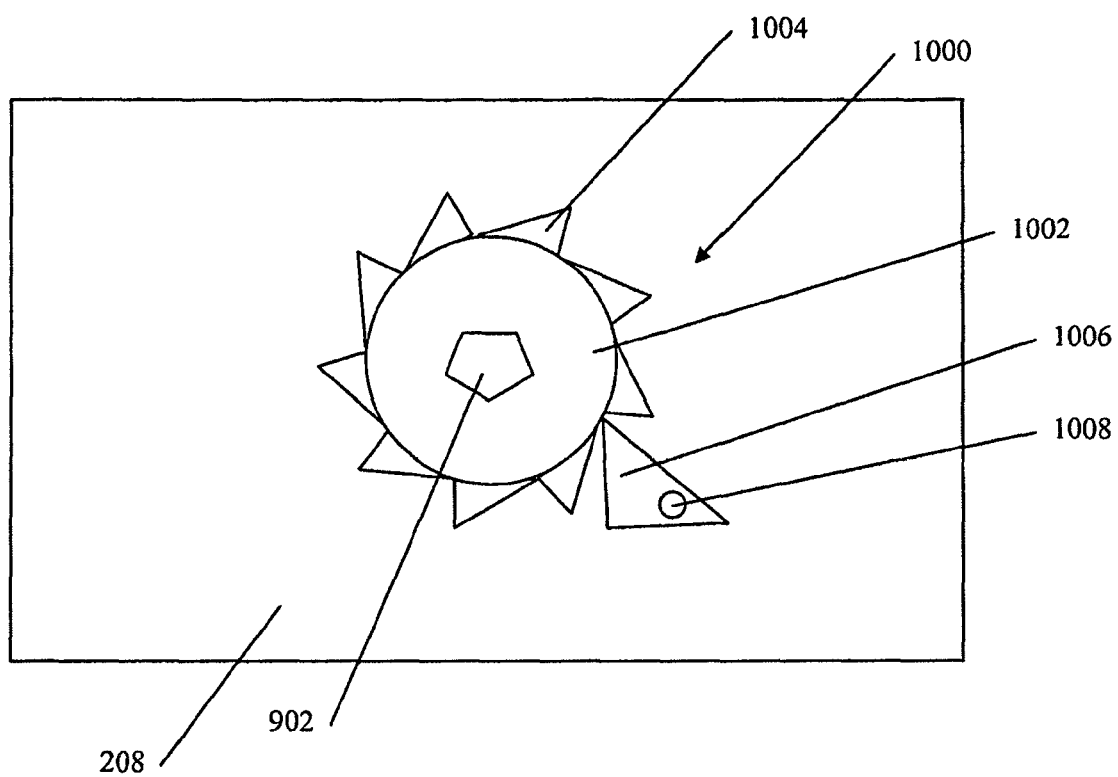
FIG. 10 shows a non-limiting embodiment of a ratcheting system used in the tool shown in FIG. 9A.

For example, FIG. 10 shows a non-limiting embodiment of a ratcheting system 1000 that comprises a wheel 1002, which has teeth 1004, and a lever 1006, which pivots about a pin 1008. The wheel 1002 is rigidly coupled to the axle 900 and is disposed on the outer side of the housing 208, and the pin 1008 is rigidly coupled to the outer wall of the housing 208. As shown in the figure, when the axle 900 rotates in the first direction (e.g., a counterclockwise direction), the shape of the teeth 1004 and the shape of the lever 1006 freely allow the axle 900 to rotate. On the other hand, when the decompressing force of the run flat device 14 improperly attempts to rotate the axle 900 in the second direction (e.g., a clockwise direction), the lever 1006 engages the teeth 1004 and prevents the axle 900 from rotating. Of course, the user may disengage the lever 1006 from the teeth 1004 after the run flat device 14 is contained in the cavity 12 of the wheel 10 to allow the device 14 to decompress at the appropriate time.

Figure 11A:
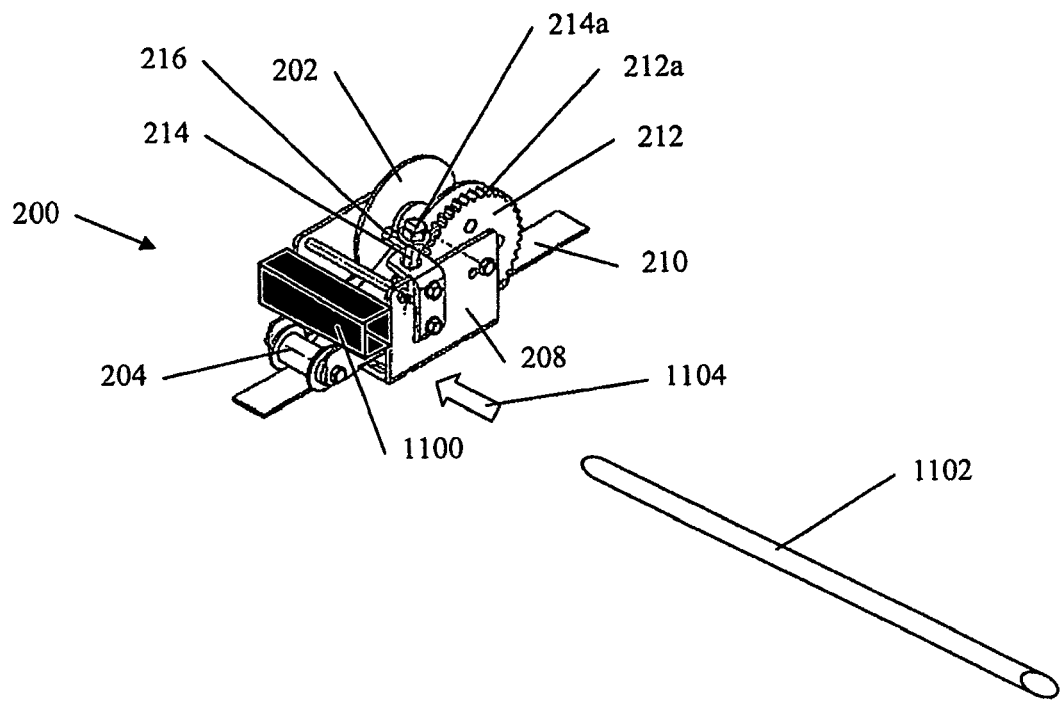
FIG. 11A is a perspective view of a tool in accordance with another illustrative, non-limiting embodiment of the present invention.
Figure 11B:
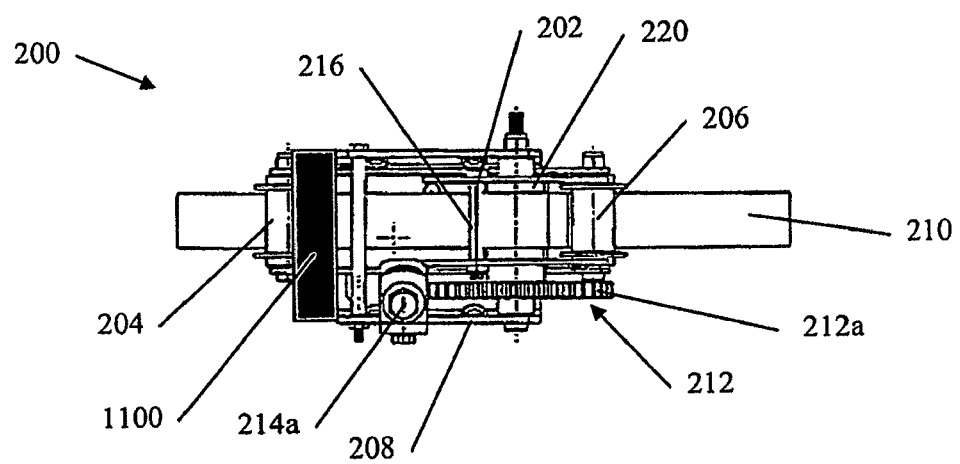
FIG. 11B is a top view of the tool shown in FIG. 11A.

FIG. 11A is a perspective view of another illustrative, non-limiting embodiment of the tool 200, and FIG. 11B is a top view of the tool 200. Components that are the same as or similar to the components described above in conjunction with the previous embodiments are designated with the same reference numerals. Also, for the sake of clarity and brevity, a detailed discussion of such components will not be repeated.

As shown in the figures, the tool 200 comprises a hollow stabilizer bar 1100 that is securely coupled to the housing 208. In the exemplary embodiment, the bar 1100 is located on the side of the housing 208 and above the roller 204. However, upon reading the specification, one skilled in the art will readily recognize that the stabilizer bar 1100 may be located at various locations on the tool 200.

As further shown in FIG. 11A, a user can insert a rod 1102 through the hollow portion of the bar 1100 by inserting the rod 1102 in the direction indicated by the arrow 1104. The rod 1102 is rigid and may be part of the standard equipment (e.g., part of a jack assembly) that comes with a vehicle using the run flat device 14.

Figure 12:
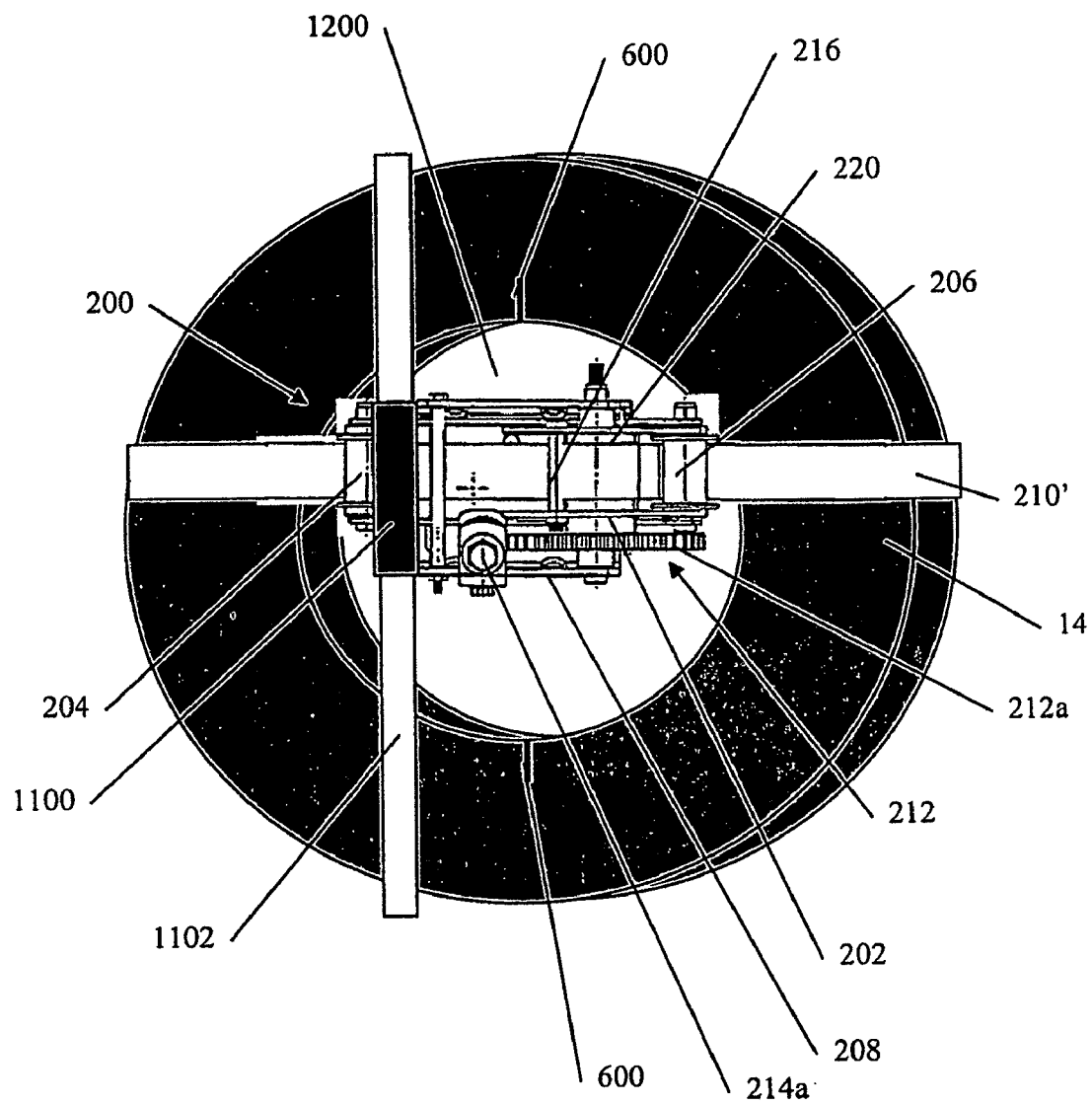
FIG. 12 shows an illustrative example of how the tool shown in FIG. 11A is attached to a run flat device before the tool compresses the run flat device.

As shown in FIG. 12, a user may insert the rod 1102 through the bar 1100 before or after attaching the tool 200 to the run flat device 14 and before the tool 200 begins compressing the device 14. When the tool 200 is attached to the device 14 and the rod 1102 is inserted, the rod 1102 spans a central opening 1200 of the run flat device 14 and rests on the side of the device 14. Accordingly, when the tool 200 begins compressing the device 14, the rod 1102 and the bar 1100 prevent the tool 200 from rotating or twisting with respect to the device 14 along the longitudinal axis of the belt 210'. As such, the tool 200 remains in substantially the same orientation with respect to the run flat device 14 and thus, is more stable when the user is rotating the worm gear 214 with one of the many types of mechanisms.

Also, in the above embodiment, the rod 1102 is inserted through the stabilizer bar 1100. However, other devices, such as elongated pieces of wood, metal, etc., may be inserted through the bar 1100 to stabilize the tool 200. Also, although the bar 1100 has a square cross-section and the rod 1102 has a round cross-section, upon reading the specification, one skilled in the art will readily recognize that the components 1100 and 1102 can have many different cross-sectional shapes.

In a non-limiting implementation, the tools 200 are portable, and a user can operate them without any heavy machinery. Therefore, the tools may be used to insert run flat devices 14 into wheels 10 of military vehicles, such as humvees and light armored vehicles ("LAVs"), or other rugged vehicles, which are located in remote areas of the world.

While the various embodiments above contain different components and features, upon reading the specification, one skilled in the art readily will realize that such components and features in one embodiment may be incorporated into or combined with components and features of another embodiment. Also, the previous description of the embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents thereof.

What is claimed is:

1. A run flat compression system, comprising:
    a spool having a rotational axis;
    a first rigid member that is separated from the rotational axis of the spool in a radial direction of the spool and revolves around the rotational axis of the spool when the spool rotates;
    a belt that forms a closed loop and has an inner surface, which faces inside the closed loop, and an outer surface, which faces outside the closed loop and which opposes the inner surface,
    wherein, in an unwrapped state, the belt (1) extends towards the spool, (2) threads between the spool and the first rigid member such that the outer surface faces the first rigid member and the inner surface faces the spool, and (3) extends away from the spool,
    wherein, when the spool rotates, the inner surface of the belt contacts the spool and the first rigid member engages the outer surface of the belt to wrap the belt around the spool to decrease an effective length of the belt;
    a second rigid member,
    wherein, when the spool rotates, the outer surface of the belt contacts the second rigid member, and
    wherein the first rigid member moves relatively to the second rigid member when the first rigid member revolves around the rotational axis of the spool;
    a third rigid member,
    wherein the belt is threaded (1) under the second rigid member such that the outer surface contacts the second rigid member, (2) between the first rigid member and the spool such that the outer surface of the belt faces the first rigid member and the inner surface of the belt faces the spool, and (3) under the third rigid member such that the outer surface contacts the third rigid member, and
    wherein the spool is located between the second rigid member and the third rigid member along a threaded direction of the belt.

2. The system as claimed in claim 1, wherein a relative position between the second rigid member and the spool remains the same as the spool rotates and the first rigid member revolves, and
    wherein a relative position between the third rigid member and the spool remains the same as the spool rotates and the first rigid member revolves.

3. The system as claimed in claim 1, wherein the second rigid member comprises a roller, and
    wherein the third rigid member comprises a roller.

4. The system as claimed in claim 1, wherein, when the spool rotates:
    the second rigid member is located between a first portion of the belt and the spool in the threaded direction of the belt,
    the third rigid member is located between a second portion of the belt and the spool in the threaded direction of the belt,
    as the first rigid member engages the belt to wrap the belt around the spool to decrease the effective length of the belt, the first portion of the belt is adapted to travel towards the second rigid member at a rate that is substantially the same as a rate at which the second portion of the belt is adapted to travel towards the third rigid member.

5. The system as claimed in claim 4, wherein the first portion of the belt travels towards to the second rigid member in a first direction,
    the second portion of the belt travels towards to the third rigid member in a second direction, and
    wherein the first direction is substantially opposite to the second direction.

6. A run flat compression system, comprising:
    a spool having a rotational axis;
    a first rigid member that is separated from the rotational axis of the spool in a radial direction of the spool and revolves around the rotational axis of the spool when the spool rotates;
    a belt that forms a closed loop and has an inner surface, which faces inside the closed loop, and an outer surface, which faces outside the closed loop and which opposes the inner surface,
    wherein, in an unwrapped state, the belt (1) extends towards the spool, (2) threads between the spool and the first rigid member such that the outer surface faces the first rigid member and the inner surface faces the spool, and (3) extends away from the spool,
    wherein, when the spool rotates, the inner surface of the belt contacts the spool and the first rigid member engages the outer surface of the belt to wrap the belt around the spool to decrease an effective length of the belt;
    a second rigid member,
    wherein, when the spool rotates, the outer surface of the belt contacts the second rigid member, and
    wherein the first rigid member moves relatively to the second rigid member when the first rigid member revolves around the rotational axis of the spool,
    wherein the second rigid member comprises a roller.

7. A run flat compression system, comprising:
    a spool having a rotational axis;
    a first rigid member that is separated from the rotational axis of the spool in a radial direction of the spool and revolves around the rotational axis of the spool when the spool rotates;
    a belt that forms a closed loop and defines two regions respectively being inside the closed loop and outside the closed loop,
    wherein the spool is disposed in a first region of the two regions and the first rigid member is disposed in a second region of the two regions,
    wherein, in an unwrapped state, the belt is threaded between the spool and the first rigid member, and
    wherein, when the spool rotates, the first rigid member exerts a force on the belt to cause the belt to wrap around the spool to decrease an effective length of the belt, wherein the system further comprises:
a second rigid member, wherein the second rigid member exerts a force on the belt and is disposed in the second region of the two regions; and
a third rigid member,
wherein the third rigid member exerts a force on the belt and is disposed in the second region of the two regions.

8. The system as claimed in claim 7, wherein the spool is located between the second rigid member and the third rigid member along a threaded direction of the belt.

9. The system as claimed in claim 8, wherein, when the spool rotates:
the second rigid member is located between a first portion of the belt and the spool in the threaded direction of the belt,
the third rigid member is located between a second portion of the belt and the spool in the threaded direction of the belt, and
as the first rigid member exerts a force on the belt to cause the belt to wrap around the spool to decrease the effective length of the belt, the first portion of the belt is adapted to travel towards the second rigid member at a rate that is substantially the same as a rate at which the second portion of the belt is adapted to travel towards the third rigid member.

10. The system as claimed in claim 9, wherein the first portion of the belt travels towards to the second rigid member in a first direction,
the second portion of the belt travels towards to the third rigid member in a second direction, and
wherein the first direction is substantially opposite to the second direction.

11. A run flat compression system, comprising:
a spool having a rotational axis;
a first rigid member that is separated from the rotational axis of the spool in a radial direction of the spool and revolves around the rotational axis of the spool when the spool rotates;
a belt that forms a closed loop and defines two regions respectively being inside the closed loop and outside the closed loop,
wherein the spool is disposed in a first region of the two regions and the first rigid member is disposed in a second region of the two regions,
wherein, in an unwrapped state, the belt is threaded between the spool and the first rigid member, and
wherein, when the spool rotates, the first rigid member exerts a force on the belt to cause the belt to wrap around the spool to decrease an effective length of the belt,
wherein the system further comprises:
a second rigid member,
wherein the second rigid member exerts a force on the belt and is disposed in the second region of the two regions, and
wherein the second rigid member comprises a roller.

12. The system as claimed in claim 7, wherein the second rigid member comprises a first roller, and the third rigid member comprises a second roller.

13. The system as claimed in claim 9, wherein the first region of the two regions is inside the closed loop and the second region of the two regions is outside the closed loop.

14. The system as claimed in claim 13, wherein the second rigid member comprises a first roller, and the third rigid member comprises a second roller.

* * * * *